US010419063B2

(12) United States Patent
Orlov et al.

(10) Patent No.: US 10,419,063 B2
(45) Date of Patent: Sep. 17, 2019

(54) METHOD AND SYSTEM FOR RECEIVING TELEMETRY MESSAGES OVER RF CHANNEL

(71) Applicant: Waviot Integrated Systems LLC, Watertown, SD (US)

(72) Inventors: Andrey Olegovich Orlov, Moscow (RU); Vasiliy Vasilievich Anisimov, Moscow (RU); Alexey Andreevich Danilov, Nizhny Novgorod (RU); Andrey Yurievich Puzanov, Voronezh (RU); Andrei Viktorovich Bakumenko, Lubertsi (RU); Danylo Sergeevich Batura, Mytishchi (RU)

(73) Assignee: WAVIOT INTEGRATED SYSTEMS, LLC, Watertown, SD (US)

(*) Notice: Subject to any disclaimer, the term of this patent is extended or adjusted under 35 U.S.C. 154(b) by 0 days.

(21) Appl. No.: 16/105,706

(22) Filed: Aug. 20, 2018

(65) Prior Publication Data
US 2019/0007090 A1 Jan. 3, 2019

Related U.S. Application Data

(63) Continuation-in-part of application No. 15/858,760, filed on Dec. 29, 2017, now Pat. No. 10,257,009.
(Continued)

(51) Int. Cl.
*H04B 1/707* (2011.01)
*H04L 27/227* (2006.01)
*H04L 27/233* (2006.01)

(52) U.S. Cl.
CPC .......... *H04B 1/707* (2013.01); *H04L 27/2273* (2013.01); *H04B 2201/70716* (2013.01); *H04B 2201/70728* (2013.01); *H04L 27/2335* (2013.01)

(58) Field of Classification Search
CPC .......... H04B 1/707; H04B 2201/70716; H04B 2201/70728; H04L 27/2273; H04L 27/2335
(Continued)

(56) References Cited

U.S. PATENT DOCUMENTS 5,668,837 A 9/1997 Dent
5,960,040 A 9/1999 Cai et al.
(Continued)

FOREIGN PATENT DOCUMENTS

CN 106100790 A 11/2016
CN 106341876 A 1/2017
(Continued)

OTHER PUBLICATIONS

Kerlink, Wirnet Station, Embedded Base Station Controller and Radio Network Controller, for remote operations, retrieved from https://www.kerlink.com/product/wirnet-station/ on Sep. 13, 2018.
(Continued)

*Primary Examiner* — Wednel Cadeau
(74) *Attorney, Agent, or Firm* — BCF LLP (57) ABSTRACT

A method to receive telemetry messages over an RF channel, the method implemented by a system on a chip, in which a signal is received from the output of an input RF module, the received signal is offset in time and frequency wherein the signal, at first, is offset in time so that the offset magnitudes uniformly fill the length of one data bit, then, the signal is offset in frequency so that the offset magnitudes uniformly fill the space between the Fourier transform subcarriers, with the frequency offsets being independent of the time offsets; each signal processed at the preceding step is subjected to sequential Fourier transforms, with the first time element of each next transform immediately following the last element of the preceding transform; all messages are demodulated
(Continued)

independently. The technical result consists in that messages can be received over multiple channels at multiple rates.

12 Claims, 5 Drawing Sheets
(5 of 5 Drawing Sheet(s) Filed in Color)

Related U.S. Application Data (60) Provisional application No. 62/440,906, filed on Dec. 30, 2016.

(58) Field of Classification Search
USPC .......................................................... 375/340
See application file for complete search history.

(56) References Cited

U.S. PATENT DOCUMENTS

| | | | |
|---|---|---|---|
| 5,974,098 | A | 10/1999 | Tsuda |
| 6,115,728 | A | 9/2000 | Nakai et al. |
| 7,508,889 | B2 | 3/2009 | Liu |
| 8,156,209 | B1 | 4/2012 | Phadnis et al. |
| 9,049,732 | B2 | 6/2015 | Fourtet et al. |
| 9,252,998 | B2 | 2/2016 | Seely |
| 9,768,897 | B2 | 9/2017 | Artigue |
| 9,900,197 | B1 | 2/2018 | Rada et al. |
| 10,044,098 | B2 | 8/2018 | Ali |
| 2002/0085641 | A1* | 7/2002 | Baum .................. H04L 1/0009 375/260 |
| 2003/0224725 | A1 | 12/2003 | Limberg |
| 2004/0096021 | A1 | 5/2004 | Koval |
| 2005/0169407 | A1 | 8/2005 | Schrodinger et al. |
| 2005/0188129 | A1 | 8/2005 | Abdelilah et al. |
| 2005/0237989 | A1 | 10/2005 | Ahn et al. |
| 2006/0094383 | A1 | 5/2006 | Zylowski |
| 2006/0133827 | A1 | 6/2006 | Becouarn et al. |
| 2006/0251190 | A1 | 11/2006 | Wang et al. |
| 2006/0285607 | A1 | 12/2006 | Strodtbeck et al. |
| 2007/0268980 | A1 | 11/2007 | Brannstorm et al. |
| 2007/0280098 | A1 | 12/2007 | Bhatt et al. |
| 2008/0151985 | A1 | 6/2008 | Chin et al. |
| 2008/0240285 | A1 | 10/2008 | Han et al. |
| 2011/0032620 | A1* | 2/2011 | Park .................. G02B 1/10 359/585 |
| 2011/0032920 | A1 | 2/2011 | Suberviola |
| 2011/0289156 | A1 | 11/2011 | Pimazar |
| 2012/0014488 | A1 | 1/2012 | Liu et al. |
| 2012/0051287 | A1 | 3/2012 | Merlin et al. |
| 2012/0079155 | A1 | 3/2012 | Damodaran et al. |
| 2012/0195184 | A1 | 8/2012 | Dapper et al. |
| 2013/0170464 | A1 | 7/2013 | Hwang et al. |
| 2013/0202068 | A1 | 8/2013 | Ly-Gagnon et al. |
| 2015/0092753 | A1 | 4/2015 | Gupta et al. |
| 2016/0119184 | A1 | 4/2016 | Soriaga et al. |
| 2016/0132451 | A1 | 5/2016 | Cho et al. |
| 2016/0335897 | A1 | 11/2016 | Naserian et al. |
| 2016/0373138 | A1 | 12/2016 | Li et al. |
| 2017/0139053 | A1 | 5/2017 | Vishin et al. |
| 2017/0171841 | A1 | 6/2017 | Chen et al. |
| 2018/0191540 | A1 | 7/2018 | Chalbos et al. |

FOREIGN PATENT DOCUMENTS

| | | |
|---|---|---|
| CN | 107135554 A | 9/2017 |
| ES | 2707611 T3 | 4/2019 |
| WO | 2012027880 A1 | 3/2012 |
| WO | 2017197441 A1 | 11/2017 |
| WO | 2017210142 A1 | 12/2017 |
| WO | 2018109411 A1 | 6/2018 |

OTHER PUBLICATIONS

SIGFOX Wireless Ethernet Gateway, retrieved from https://partners.sigfox.com/products/sigfox-wireless-ethernet-gateway, on Sep. 13, 2018.

Device—Wireless Gecko by Silicon Labs—information retrieved from https:/lwww.silabs.com/products/wireless/wireless-gecko-iot-connectivity-portfolio on Aug. 15, 2018.

Device—AX5043—Advanced High Performance ASK and FSK Narrow-band Transceiver for 27-1050 MHz Range, or Semiconductor, retrieved from https:/lwww.onsemi.com/pub/Collateral/AX5043-D.PDF on Aug. 15, 2018.

Wenxu Zhang et al., "Application of FFT parallel code phase search algorithm in GNSS software" 2016 IEEE 13th International Conference on Signal Processing (ICSP). Online at https://ieeexplore.ieee.org/abstract/document/7878011/.

Notice of Allowance with regard to the counterpart U.S. Appl. No. 16/220,188 dated Feb. 13, 2019.

Notice of Allowance with regard to the counterpart U.S. Appl. No. 15/858,784 dated Feb. 7, 2019.

Device—Wireless Gecko by Silicon Labs—information retrieved from https://www.silabs.com/products/wireless/wireless-gecko-iot-connectivity-portfolio on Aug. 15, 2018.

Device—AX5043—Advanced High Performance ASK and FSK Narrow-band Transceiver for 27-1050 MHz Range, On Semiconductor, retrieved from https://www.onsemi.com/pub/Collateral/AX5043-D.PDF on Aug. 15, 2018.

International Search Report issued in respect of the International Patent Application PCT/US19/16750 dated May 8, 2019.

English translation of CN106100790 received together with the International Search Report in respect of the International Patent Application PCT/US19/16750 dated May 8, 2019.

\* cited by examiner

METHOD AND SYSTEM FOR RECEIVING TELEMETRY MESSAGES OVER RF CHANNEL

CROSS REFERENCE

The present application is a continuation-in-part of U.S. patent application Ser. No. 15/858,760, filed on Dec. 29, 2017, entitled "A Method for Multichannel Signal Search and Demodulation and Technique to Demodulate and Detect DBPSK FDMA Ultra-Narrow Band Signal", which claims priority to the US provisional application No. 62/440,906, filed on Dec. 30, 2016. Both of these applications are incorporated by reference herein in its entirety.

FIELD OF THE TECHNOLOGY

The present technical solution relates to communication networks and more specifically to methods and systems for receiving telemetry messages over an RF channel.

BACKGROUND

At present, BPSK/DBPSK messages are received using widely known algorithms. Generally, BPSK messages are received coherently, e.g., with the aid of the Costas loop, whereas DBPSK messages are received non-coherently. Usually, BPSK messages are received in the coherent mode using the Costas loop or other circuits that are built using the Costas loop. For non-coherent reception of DBPSK messages, various algorithms based on estimation of the phase difference between adjacent bits may be used. Coherent reception is generally believed to be more efficient, but is known to require significant computational resources, especially when used in a low signal-to-noise ratio environment (for example, when the signal is weak).

U.S. Pat. No. 9,049,732 (Entitled: Method for Using a Shared Frequency Resource, Method for Manufacturing Terminals, Terminals and Telecommunication System, Assignee: SIGFOX™, date of publication: 2015-06-02) discloses that Fourier transforms are carried out with a desired frequency resolution, then, energy peaks are searched for, whereupon all frequencies having such peaks are brought around to a low frequency where the signal is filtered and detected (the process may be both coherent and non-coherent, the algorithms are known in the art).

A disadvantage of this prior art technology appears to be high computational complexity. Part of the computations may be repeated at least twice, when energy peaks are searched for and the signal is filtered.

Currently, various Systems-on-a-Chip (or SoC/SoCs for short) capable of receiving/transmitting RF signals are known and commercially available. Such systems are widely used for applications where a size of a device is limited and low power requirements and cost are of the essence.

Some of the known Systems-on-a-Chip are capable of receiving/transmitting PSK or DPSK messages One example of such known System-on-a-Chip is a series of the Wireless Gecko systems of Silicon Labs. Some known Systems-on-a-Chip of this series, e.g., EFR32xG13 Wireless Gecko, support data transmission using the DBPSK technique. However, known Systems-on-a-Chip of this series cannot receive DBPSK signals.

Another example of the known Systems-on-a-Chip supporting BPSK is the AT86RF212 system manufactured by Microchip, BPSK is used in direct sequence spread spectrum operation at bit rates of 20 and 40 kbps. The system sensitivity in this mode is up to −100 dBm.

These prior art Systems-on-a-Chip appear to have a number of disadvantages making it challenging to apply such known System-on-a-Chip in telemetry data acquisition networks.

Some such known Systems-on-a-Chip fail to support BPSK message reception. Most known Systems-on-a-Chip support operation at rates of 10 kbps or higher, with the transmission range usually not exceeding several thousand meters. Axsem ax5043 supports BPSK message reception at 100 kbps, whereby a sensitivity of −138 dBm is provided, however, such sensitivity can be provided only if the receive and transmit frequencies coincide.

Also known in the art are: systems using original modulation; CDMA based spread spectrum devices; all of these having a number of specific features known to those persons skilled in the art.

SUMMARY

The herein proposed technical solution is aimed at obviating disadvantages inherent in the prior art solutions.

Developers of the present technology have aimed to provide a technical solution to allow messages to be received by a receiver from at least one transmitter, with the messages transmitted at least at one rate. According to the non-limiting embodiments of the present technology, the messages are to be received by a System-on-a-Chip (SoC), the system being configured to receive a signal over the air or from an external RF module, detect such RF signals emitted by a transmitter(s) and receive the transmitted messages. At least some of the non-limiting embodiments of the present technology allow for receiving BPSK or DBPSK messages without the use of the spread spectrum.

At least some of the non-limiting embodiments of the present technology allow for receiving messages over multiple channels at multiple rates At least some of the non-limiting embodiments of the present technology allow for a higher quality of the received messages.

At least some of the non-limiting embodiments of the present technology allow for message reception on arbitrary and previously unknown frequencies within the processed frequency band.

In accordance with the first broad aspect of the present technology, there is provided a method for receiving telemetry messages via an RF channel. The method is executable in a System-on-a-Chip (SoC), the SoC including an input RF module. The method comprises: receiving, via the RF channel, from an output port of the input RF module, a signal that includes a telemetry message; offsetting the signal, the offsetting being executed by: at first, offsetting in time the signal such that the offset magnitudes are uniformly spread over a length of data having one bit of information; then, offsetting in frequency the signal such that the offset magnitudes are uniformly spread over the space between the Fourier transformation subcarriers, the offsetting in frequency being done independently from the offsetting in time; subjecting the signal to a sequential Fourier transform, the subjecting being executed such that a first time element of the sequential Fourier transformation is located immediately sequentially to a last time element of a previous Fourier transform, and the length of Fourier transform coincides with a bit length of the telemetry message; demodulating the signal based on Fourier coefficients, the demodulation of the signal being executed independently relative to demodulating of other signals by the SoC.

In some implementations of the method, the sequential Fourier transformation is executed with a start times t0 having been offset in between themselves.

In some implementations of the method, the method further comprises verifying an integrity of the message.

In some implementations of the method, the verifying comprises checking a check sum.

In some implementations of the method, the check sum comprises a cyclic redundancy check.

In some implementations of the method, the method further comprises executing message validity checks of the signal, the message validity checks being executed independently from message validity checks of other signals.

In some implementations of the method, the method further comprises filtering out coincident repeated messages that have been independently demodulated.

In some implementations of the method, the demodulating comprises using inphase and quadrature components of each Fourier coefficient independently between themselves.

In accordance with another broad aspect of the present technology, there is provided a System-on-a-Chip (SoC) for receiving telemetry messages over an RF channel. The SoC comprises: at least one RF module configured to receive a signal from a transmitting device antenna; at least one memory unit configured to store the signal; at least one computer configured to: receive, via the RF channel, from an output port of the input RF module, a signal; offset the signal, the offsetting being executed by: at first, offsetting in time the signal such that the offset magnitudes are uniformly spread over a length of data having one bit of information; then, offsetting in frequency the signal such that the offset magnitudes are uniformly spread over the space between the Fourier transformation subcarriers, the offsetting in frequency being done independently from the offsetting in time; subject the signal to a sequential Fourier transform, the subjecting being executed such that a first time element of the sequential Fourier transformation is located immediately sequentially to a last time element of a previous Fourier transform, and the length of Fourier transform coincides with a bit length of the telemetry message; demodulate the signal based on Fourier coefficients, the demodulation of the signal being executed independently relative to demodulating of other signals by the SoC.

In some implementations of the SoC, the signal originates from the at least one RF module, the at least one RF module being external to the SoC.

In some implementations of the SoC, the SoC further comprising a low noise signal amplifier.

In some implementations of the SoC, the SoC further comprising at least one of a receiving antenna and a transmitting antenna In some implementations of the SoC, the SoC further comprising a reference frequency oscillator.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The features and advantages of the non-limiting embodiments of the present technology will become more apparent with reference to the following detailed description and the accompanying drawings, in which.

DETAILED DESCRIPTION OF THE
NON-LIMITING EMBODIMENTS

The non-limiting embodiments of the present technology can be implemented in a System-on-a-Chip. In some embodiments of the present technology, the system can be implemented in a form of a very large scale integrated circuit comprising digital signal processing units, control units and interfaces with peripheral devices. In some embodiments of the present technology, the System-on-a-Chip can further include analog signal processing units. Additionally or alternatively, such analog signal processing units may be implemented as an individual very large scale integrated circuit.

Within the description provided herein below, a "signal" is a physical entity containing certain information.

Within the description provided herein below, a System-on-a-Chip (SoC) (as is generally known in microelectronics) is an electronic circuit performing functions of a single device (e.g., a computer or a radio receiver) and suitably arranged on a single chip.

Within the description provided herein below, digital signal processing is a signal processing technique based on numerical methods and performed using digital computing systems, for example, digital SoC units.

Within the description provided herein below, phase-shift keying (PSK) is a phase keying technique in which the carrier wave phase changes stepwise depending on a data message. Differential binary phase-shift keying (DBSK) is a type of PSK in which information is encoded by changing the phase between symbols.

Within the description provided herein below, check sum is a certain value calculated based on a data set using an appropriate algorithm. In accordance with the non-limiting embodiments of the present technology, the check sum can be used to check data integrity during transmission or storage of data.

Within the description provided herein below, cyclic redundancy check (CRC) is an algorithm to generate a check sum, which can be used to check data integrity. In accordance to some non-limiting embodiments of the present technology, the CRC can be implemented using a polynomial division over a finite field.

Within the description provided herein below, digital filter (as is generally known in electronics) is any filter used to process a digital signal to separate and/or suppress certain frequencies of this signal.

Within the description provided herein below, decimation is a reduction of a sample rate of a discrete time signal by removing certain signal samples.

Within the description provided herein below, amplitude-frequency characteristic (AFC) is the amplitude of a certain system output signal versus the frequency of an input harmonic signal of such system.

Within the description provided herein below, quadrature demodulation is a process of signal conversion to a quadrature form accompanied by extraction of the inphase and quadrature components.

Within the description provided herein below, the Fourier transform is an operation transforming one function of a complex variable to another function of a complex variable and describing the coefficients used to decompose the initial function to elementary components, i.e., harmonic oscillations of different frequencies.

Within the description provided herein below, Fourier transform Discrete Fourier transform is an operation transforming a sequence of complex values of a certain function to a series of the complex coefficients of elementary components, i.e., harmonic functions.

Within the description provided herein below, Fast Fourier transform (FFT) is a discrete Fourier transform (DFT) computation algorithm.

Within the description provided herein below, channel capacity is a maximum rate at which a channel can transmit data error free. Bit rate is a data volume in bits that is conveyed per unit of time.

Within the description provided herein below, clock generator is a device producing electric pulses of a preset frequency which frequency is used as a reference frequency.

Within the description provided herein below, bandwidth is a range of frequencies within which the amplitude-frequency characteristic (AFC) of an acoustic, radio, optical or mechanical device is sufficiently uniform to allow signal transmission without material distortions of the signal shape.

Within the description provided herein below, sample rate is the number of samples of a time-continuous signal taken, i.e., by an analog-to-digital converter.

Within the description provided herein below, time resolution is a time interval determined at a fixed signal-to-noise ratio and equaling a minimum width of any of two square pulses which are emitted in sequence at a period-to-width ratio of two and still picked up separately.

Within the description provided herein below, coherent reception is a signal reception technique using a reference oscillation that is an exact copy of the transmitted signal. If the signal is an oscillation with a known frequency and phase, a coherent receiver uses a synchronous detector having the reference oscillation thereof in synchronism with the carrier frequency oscillation taking into account the initial phase of the received signal.

Within the description provided herein below, non-coherent reception is a signal reception technique that makes no allowance for information on the initial phase of a received signal.

Within the description provided herein below, symbol synchronization is a synchronization technique that removes mismatch between received and reference signals accurate to within one symbol.

DBPSK, as distinct from BPSK, allows non-coherent detection. Therefore, in various non-limiting embodiments of the present technology, the differential phase-shift keying (DBPSK) technique is used to transmit messages.

The non-limiting embodiments of the present technology are particularly suitable for use in data acquisition networks of telemetry systems that need data to be generally transmitted in volumes of not more than 10 to 100 bytes to a distance of at least one kilometer. Specifically, the non-limiting embodiments of the present technology can be used for transmitting data representative of a sensor status (e.g., door opening sensor). Also the non-limiting embodiments of the present technology are suitable to transmit instrument data (e.g., a utility meter). Taking in consideration these features, a bit rate of 50 bps can be used to transmit messages.

The non-limiting embodiments of the present technology are intended to receive multiple messages within the processed receiver bandwidth (e.g., currently, in the RF, the unlicensed frequency band in which the non-limiting embodiments of the present technology may be used ranges from 868.7 to 869.2 MHz). It is assumed that the start-of-transmission time of each individual message is unknown and differs from that of the other messages to be transmitted.

A message is a data frame having a size of ten bytes or more and a format known both to a transmitting device and to a receiving device, with the data frame content allowing detection and reception thereof by the receiver. The message contains a known sequence of bits called preamble, which is used to initially search for the message in the input signal, and data of the message proper. In some non-limiting embodiments of the present technology, the message also contains additional service information, e.g., a transmitted messages counter. In other non-limiting embodiments of the present technology, the message contains a check sum, a cyclic redundancy check or another set of additional data used to check the message for correct reception. The message may also contain additional forward error correction coding data to correct errors in the received message.

Receiving device is a device comprising the herein described SoC. The receiving device may also include analog signal processing units. In some non-limiting embodiments of the present technology, the analog signal processing units (RF module is a set of units using the analog technique to process a signal, including an RF signal) are incorporated in the non-limiting embodiments of the present technology. The receiving device may include other units, e.g., a general-purpose computing device, other units required for the receiving device to serve the purpose thereof, e.g., units controlling or altering something. In addition, the receiving device may include an antenna to directly receive/transmit an RF signal from/to the air.

The message transmission frequencies are unknown to the receiving device and arbitrary within the bandwidth thereof. In some non-limiting embodiments of the present technology, the transmit frequency is selected from a set of frequencies known to the transmitting device (from a frequency grid thereof). In other non-limiting embodiments of the present technology, the transmit frequency may be fixed for each device, or pseudorandom, or may be set by a user. A preset frequency generation error in this case on the transmitted device side may materially exceed both the message band and the frequency grid step (a space between the adjacent frequencies of the grid).

In some non-limiting embodiments of the present technology, a message transmit frequency may be selected depending on a check sum, e.g., a message cyclic redundancy check.

In some preferred embodiments of the invention, the grid step is 100 or 200 Hz. The signal band in this case may be less or more than the grid step, i.e., the signal band and the characteristics of the frequency assembly used may be independent of each other. A carrier frequency setting error on the transmitting device side may be 1000 Hz or higher.

The receiving device lacks accurate information on exact time and frequency of message transmission because time and frequency setting accuracy of the transmitting device depends on the accuracy of a clock generator, accuracy of an RF frequency oscillator, accuracy of real time clocks, a specific production process used to manufacture the transmitting device and components thereof, ambient air temperature and many other factors. Telemetry data acquisition systems often cannot compensate for all aforesaid factors on the transmitting device side. Other prior art systems may have means to provide for such compensation, e.g., in cellular communication, the accuracy of signal transmission time setting is provided by synchronizing client cell phone clocks with base station clocks. Also, in some embodiments of the devices of other prior art systems, accurate signal transmission time is taken from a satellite navigation system.

In accordance with some non-limiting embodiments of the present technology, a bit rate of 50 bps is used. However, it should be expressly understood that the other non-limiting embodiments of the present technology, other bit rates values can be selected and used.

Figure 5:
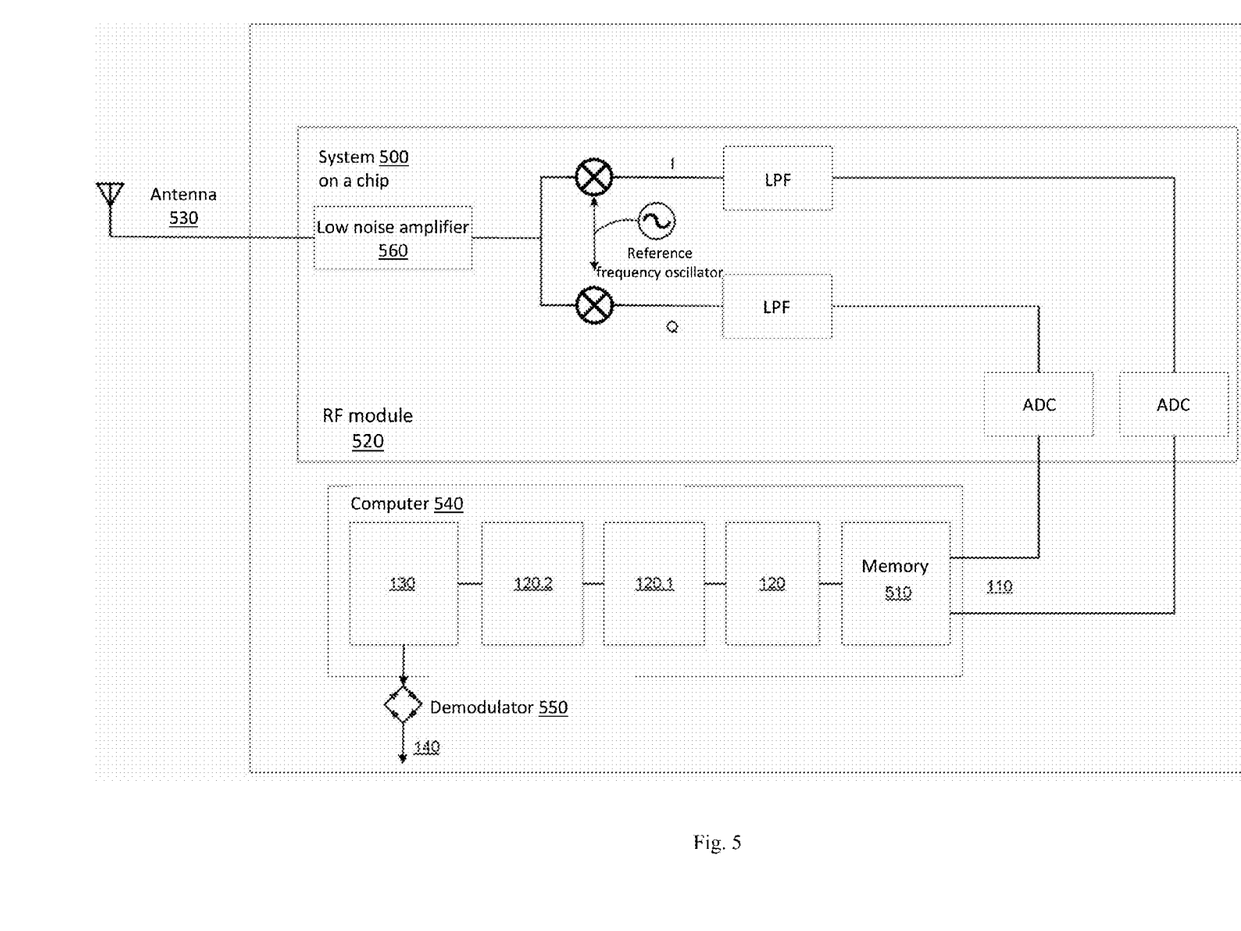
FIG. 5 is a schematic diagram of a System-on-a-Chip for receiving telemetry information messages over an RF channel, the system being implemented in accordance with non-limiting embodiments of the present technology.

In accordance with the non-limiting embodiments of the present technology, there is provided a system 500 (also can be referred herein below as SoC 500), as schematically illustrated in FIG. 5. The system 500 is configured to receive RF signals and to process them as will be described below.

Figure 1:
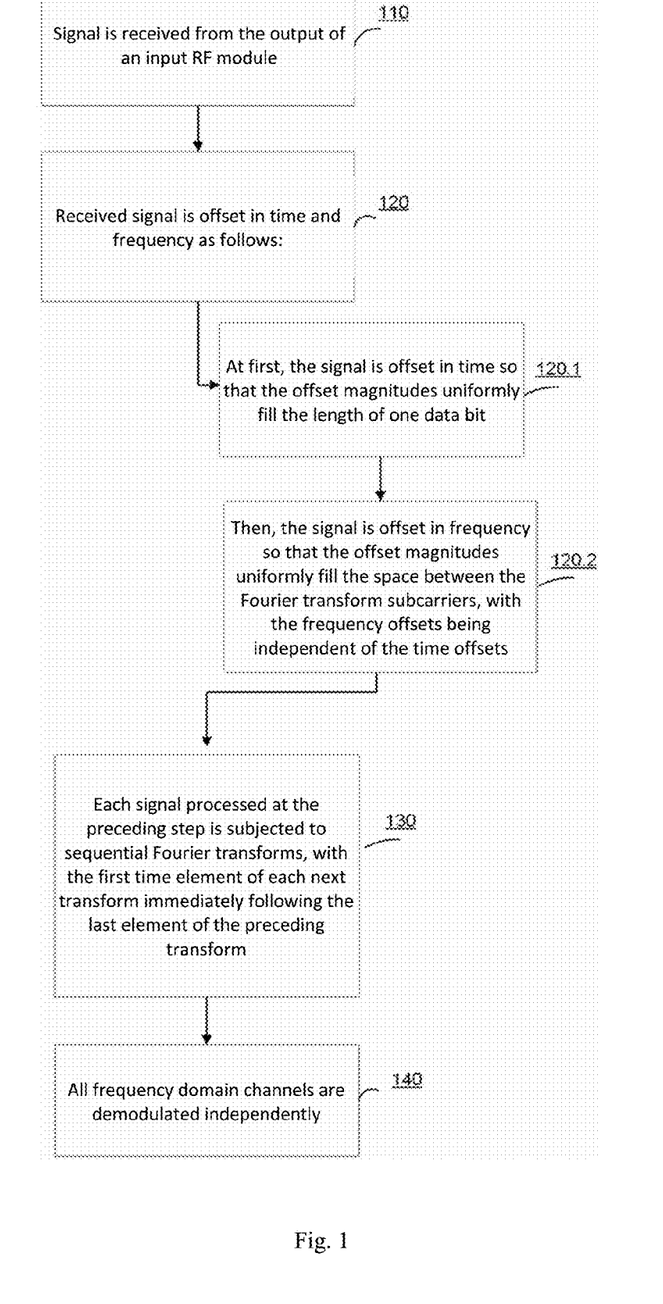
FIG. 1 depicts a block diagram of a flow chart of a method for receiving telemetry messages over an RF channel, the method in accordance to the non-limiting embodiments of the present technology.

A method for receiving telemetry information over an RF channel is illustrated in FIG. 1 in a form of a block diagram. The method illustrated in FIG. 1 can be implemented in the system 500.

Step 110: a signal is received from an output port (not depicted) of an input RF module 520.

The signal received from the RF module 520 may contain messages from one or more transmitting devices. However, it is also envisioned that the signal may contain no messages from the devices.

In accordance with the non-limiting embodiments of the present technology, the RF module 520 may be configured to:
  separate and isolate receive/transmit paths;
  connect to a receiving path of a receiving antenna;
  amplify the signal coming from the antenna;
  filter the signal using an analog technique;
  generate a reference frequency;
  Transform the signal to a low frequency region for subsequent analog processing;
  perform signal analog-to-digital conversion.

In some non-limiting embodiments of the present technology, the RF module 520 perform quadrature signal demodulation.

In other non-limiting embodiments of the present technology, the RF module 520 also provides for RF signal transmission and in this case the RF module 520 may serve the following functions:
  digital-to-digital conversion (using a DAC),
  RF frequency generation (using a frequency oscillator),
  quadrature modulation (using a modulator),
  direct DBPSK modulation using RF signal phase shifting,
  signal amplification (using a low noise amplifier),
  analog signal filtering,
  act as an RF interface to a transmitting antenna.

In accordance with the non-limiting embodiments of the present technology, the RF modules 520 are configured to support operation in at least four ranges for worldwide operation using up to four transmit and up to four receive paths. The number of each assembly used in the four-range unit may vary from one to four. For example, the RF module 520 may be used incorporating four duplexers and capable of operating on four individual antennas.

In some non-limiting embodiments of the present technology, the system 500 comprises analog units functioning as the RF module. Within these non-limiting embodiments of the present technology, such analog units can be configured to perform: (i) amplification (e.g., a low noise amplifier 560), (ii) RF signal filtering, (iii) quadrature modulation, and (iv) analog-to-digital conversion. In other non-limiting embodiments of the present technology, the RF module 520 can be installed together with the system 500, for example, using the same housing. In still other non-limiting embodiments of the present technology, an individual prior art RF module with the desired characteristics can be used.

In some non-limiting embodiments of the present technology, the system 500 additionally comprises digital input signal (an RF signal is implied) processing units, such as for example, digital filters and other units.

Step 120: the received signal is offset in time and frequency.

At step 120, a computer 540 executes offsetting (in time and frequency).

At first, the signal is offset in time so that the offset magnitudes uniformly fill the length of one data bit (step 120.1 in FIGS. 1 and 5).

Then, the signal is offset in frequency so that the offset magnitudes uniformly fill the space between the Fourier transform subcarriers, with signal frequency offsets being performed on all signal offsets in time independently (step 120.2 in FIGS. 1 and 5).

Step 130: further, the signal obtained at step 120 is processed using sequential Fourier transforms. In accordance with the non-limiting embodiments of the present technology, the step 130 is executed such that a first element of each subsequent transform immediately follows a last element of the preceding transform.

A series of sequential Fourier transforms of the $N^{th}$-order input signal is performed. The first series of transforms is performed by the computer 540 on data coming at sample rate $F_{input}$ beginning from time point t0 (blue line in FIG. 2), the next transform begins from time point t1 (red line in FIG. 2, an additional frequency offset is shown as well), etc. Within the description presented herein, a term "a frequency domain channel" is used to denote a number of complex coefficients of one of the harmonics at the Fourier transform output, yielded as a result of a series of sequential Fourier transforms, with a specific time offset of the first transform in the series and a common frequency offset. Thus, each series of the transforms yields N frequency channels.

Figure 2:
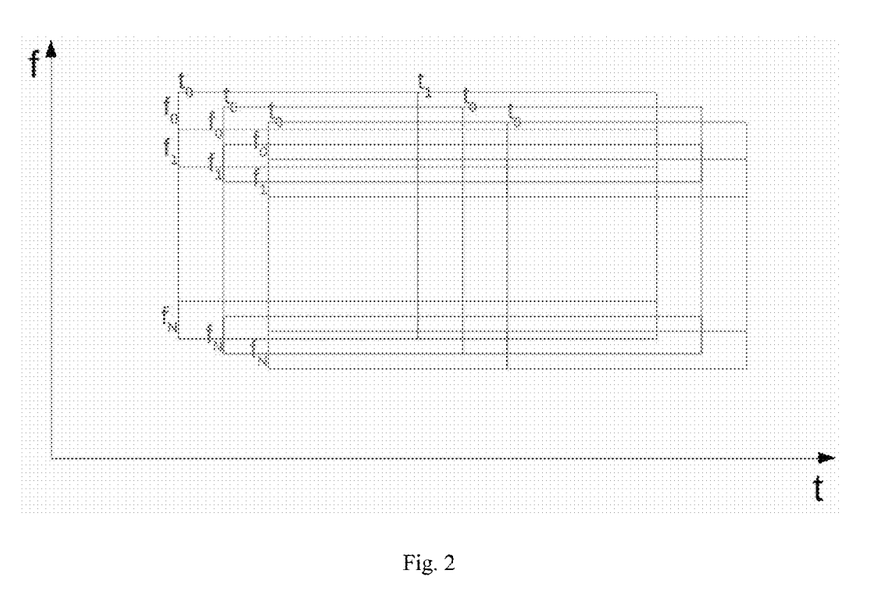
FIG. 2 a schematic depiction of a series of Fourier transforms in the time-frequency plane.

For example, a stream comes to the receiving device input at sample rate $F_{input}$=51200 Hz, then, the fast Fourier transform with N=1024 is performed and 1024 channels with a sample rate of 50 Hz are obtained, with the data in these channels transmitted at rate 1/N of the input rate. If the Fourier transform in this case is performed with N=16, then 16 channels with a sample rate of 3200 Hz are obtained. The information on the frequency domain channels thus obtained will be contained in the complex coefficients of relevant harmonics at the FFT output.

The Fourier transforms allow all frequencies f0, f1 ... $f_N$ corresponding to the Fourier transform subcarriers to be brought to the zero frequency. When this happens, filtration is performed concurrently with the summing operation in the Fourier transform.

The time length of the frame fed to the Fourier transform unit is selected to be in coincidence with the bit length. Let's consider one particular frequency domain channel. In case of ideal bit synchronization, i.e., when the start and the end of a data frame fed for the Fourier transform coincide with the actual start and the actual end of the bits being transmitted, each coefficient of the harmonic after the Fourier transform will contain information on only one bit and the information on each bit, at the same time, will be contained only in one coefficient.

Selection of such Fourier transform parameters makes it possible, in case of bit synchronization close to ideal, to immediately use the data in the frequency channels in order to detect messages in the input signal and demodulate data. With this scheme, the entire input band may be used, but it fails to provide precise time synchronization in one selected channel. No reception is possible in one selected channel if the start and the end of bits in the air fail to coincide with the start and the end of Fourier transforms. It is known to a person skilled in the art that for bit synchronization, at least four points per symbol are required as a rule (in the preferred embodiment of the invention, the symbol is one bit). For example, in OFDM systems, time synchronization resolution is one clock of the common synchronization frequency for the entire bandwidth.

In some non-limiting embodiments of the present technology, in order to improve the circuit time resolution, all series of Fourier transforms can be used (blue, red and green in FIG. 2 and others not shown in FIG. 2), in which initial time points t0 are offset with respect to each other within the bit length. The Fourier transform length, in this case, remains equal to the bit length. Thus, instead of enhancing resolution to search for time synchronization after the FFT in each individual series of transforms, several series of transforms are used to improve the overall quality of system bit synchronization.

Similarly, the receiver frequency resolution can be improved by use of frequency offsets because the resolution of one FFT is limited by a space between the subcarriers thereof.

Other versions of series of transforms (i.a., those offset in time in any way possible with respect to the illustrated ones) are not shown in FIG. 2 for convenience.

All of the above-described steps, including generation of results of all signal offsets in time and frequency, can be performed by the computer 540 continuously in real time whether the messages are available or not.

Figure 3:
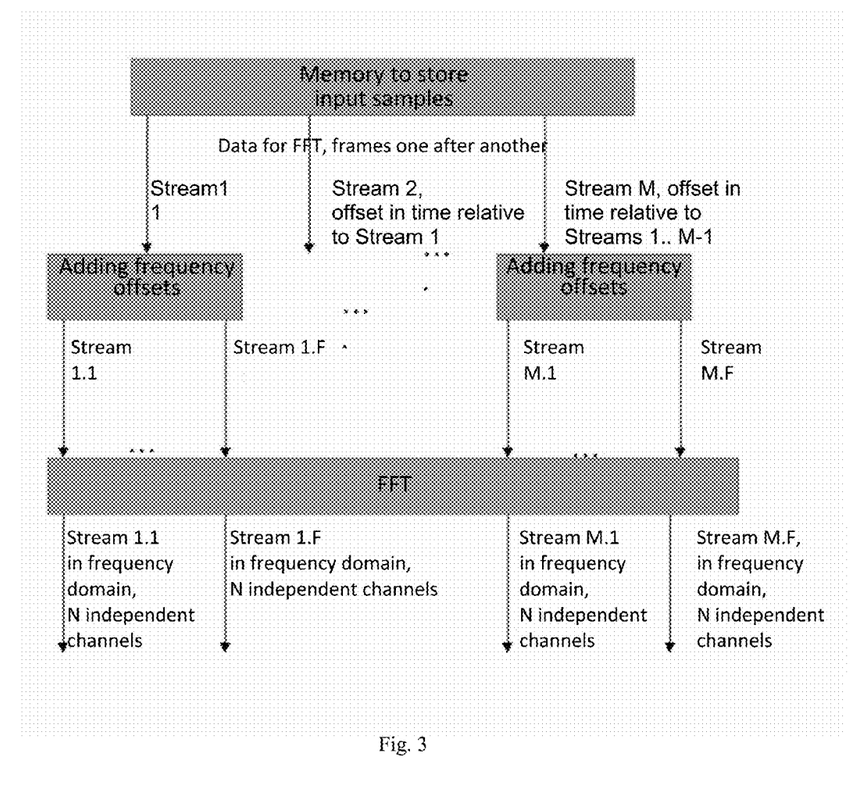
FIG. 3 is a unit connection diagram used in at least some non-limiting embodiments of the present technology.

Schematically, the computation process, until the samples in the frequency domain are obtained, is illustrated in FIG. 3.

M parallel coincident data streams go out of an input buffer, the streams differing in the start-of-the-data frame and end-of-the-data frame marks for the next FFT. The input data stream comes from the RF module 520 or digital signal processing units P at sample rate $F_{input}$. The input buffer is a memory unit sufficient to store N time samples.

As a non-limiting illustration, let's assume that the input stream comes at a rate of 51200 Hz, the samples are entered into the input buffer. Samples 1 to 1024 form the first frame in the first series of Fourier transforms, the next frame in this series will contain samples 1025 to 2048 and so on. The probability that the next message bit will start near the beginning of the next frame is obviously low. For example, the bit may start from sample 512 and if this is the case one bit half falls within the first frame and the other bit half, within the second frame. As a result, the message will not be received. This situation cannot be remedied within one series of Fourier transforms because the transform length should coincide with the bit length so that in case of good bit synchronization the Fourier transform results may be used for signal detection and reception.

Therefore, additional series of Fourier transforms are initiated—the second: from sample 257 to sample 1280, then, from sample 1281 to sample 2304 and so on. This series will be offset against the first series by 256 samples, which amounts to a quarter of the bit length. Similarly, two series more—from sample 513 to sample 1536 and then from sample 1537 to sample 2560 and so on are generated with a half-of-bit-length offset against the first series, and the fourth series—from sample 769 to sample 1972 and so on is generated with a three-quarters-of-bit-length offset. The first frame of the next series added in the same manner will be the second frame of the first series and then the $5^{th}$ series will coincide with the first series.

Now, if, e.g., a bit begins near sample 500, it means that this bit begins close to the start of the third series of offsets and, hence, samples 512 to 1536 within the frame will mostly belong to the same bit and this is true for all frames in this series.

It is obvious, that under the worst-case conditions the bit may begin between the starts of the adjacent frames, e.g., near sample 128. In this case, the bit will cross both frame 1-1024 and frame 256-1280 by ⅞ of the length thereof, wherefore the signal may be received in either case (or even in both cases).

In some non-limiting embodiments of the present technology, the Fourier transform subcarriers are spaced approximately 50 Hz apart. The signal bandwidth is of the order of 70 Hz. Inasmuch as a precise frequency of the received signal is unknown, a situation might arise in which the bandwidth center frequency of the received signal turns out to be between the Fourier transform subcarriers.

The same is true for the time synchronization situation, the bandwidth center frequency of the received signal can be closer to one of the Fourier transform subcarriers.

For adding new subcarrier frequency positions, each data stream is fed to a frequency offset adding unit that is also arranged on the system 500. Each offset, as noted above, is less than the space between the FFT subcarriers and serves to increase the FFT size. All M streams are offset in frequency by F offsets (including the 0 Hz offset, i.e., absence of the offset). Thus, in total, data having M*F frequency and time offset versions are fed to the FFT unit.

To this end, the input data are offset in frequency similarly to time offsets so that the offsets thus obtained fill the space between the subcarriers of one Fourier transform.

For example, if the Fourier subcarriers are spaced 50 Hz apart, +16 Hz and +33 Hz offsets are performed (which is the same as the −16 Hz offset accurate to within the adjacent subcarriers); thus, the subcarrier grid of the Fourier transform for the entire system 500 will be expanded. Frequencies of ±16 Hz, ±32 Hz, ±66 Hz, etc. will be added to frequencies of 0 Hz, ±50 Hz, ±100 Hz, etc.

Figure 4:
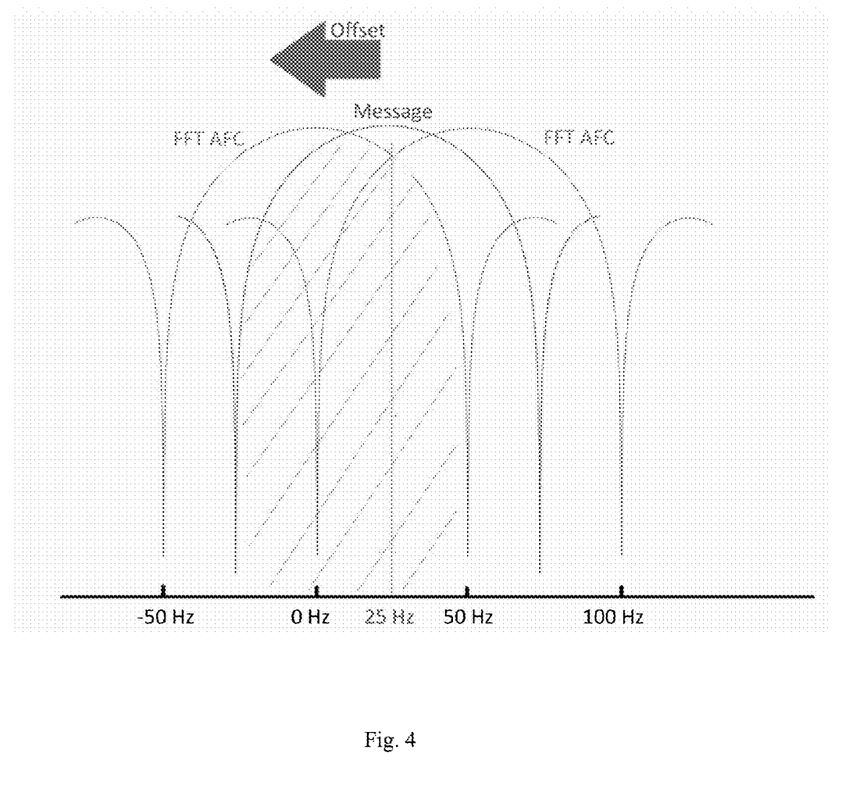
FIG. 4 is a schematic illustration of amplitude-frequency characteristics of the adjacent channels of the Fourier transform and the effect of the data frequency offset on the reception.

The embodiment of FIG. 4 shows (in blue) two amplitude-frequency characteristics of the adjacent FFT subcarriers. As seen in the figure, some messages (shown in red) have no frequency coincidence with any of the Fourier transform subcarriers. As a result, a message will not be detected due to such frequency difference and a signal-to-noise ratio at the Fourier transform output will be degraded. FIG. 4 also shows the direction of one of the frequency offsets that extends the hatched area of the signal offset toward the nearest subcarrier.

M*F independent parallel data channels (with all possible frequency offsets and all time offsets) will be connected to the FFT unit input. Accordingly, after each FFT, N channels will be obtained and the total number of the channels will be M*N*F Step 140: all frequency domain channels are demodulated independently of each other.

The data streams undergo operations required to detect messages. For example, message preamble search, symbol synchronization, error correction, removal of channel effect and other operations may be used. When this happens, all channels are demodulated independently of each other by a demodulator 550 disregarding that the messages in such channels may coincide in time and frequency. In some non-limiting embodiments of the present technology, messages after demodulation are checked for integrity and correct reception using a check sum. For example, a cyclic redundancy check transmitted as part of the message is used for the purpose. The code value of the received message is computed and compared with the transmitted code value calculated on the transmitting device side. If the message is transmitted and received correctly, the two values coincide.

In one non-limiting embodiment of the present technology, the demodulator 550 independently uses an inphase and quadrature components of each frequency domain channel. For example, data may be received in compliance with the component signs, with the positive value corresponding to data bit 0 and the negative value, to data bit 1 or vice versa. For ambiguity removal, known techniques may be used. In some non-limiting embodiments of the present technology, a preamble may be used to associate bits with signs. In other non-limiting embodiments of the present technology, a check sum maybe used for the purpose.

In non-limiting embodiments of the present technology, a check sum (e.g., a cyclic redundancy check) transmitted as part of the message is used to check the received messages for integrity after demodulation.

The system 500 is configured to receive telemetry messages over an RF channel may be implemented, without being so limited, as schematically shown in FIG. 5.

In accordance to the non-limiting embodiments of the present technology, the wireless communication can be implemented using a sub-GHz range transceiver, type AX5043, etc.

The system 500 comprises at least one computer 540 configured to offset a received signal in time and frequency. More particularly, the computer 540 initially offsets the signal in time so that the offset magnitudes uniformly fill the length of one data bit. Next, the computer 540 offsets the signal in frequency so that the offset magnitudes uniformly fill the space between the Fourier transform subcarriers, with the frequency offsets being independent of the time offsets; each signal processed at the preceding step is subjected to sequential Fourier transforms, with the first time element of each next transform immediately following the last element of the preceding transform.

These steps (steps 120 to 130) of the method that are performed by the computer 540 have been described above in greater detail in the method description.

The computer 540 may be both softwired and hardwired. The computer 540 may include digital signal processors (DSP) or neural network processors of various types. In some non-limiting embodiments of the present technology, the computer 540 can perform steps in parallel.

Also, the system 500 may include a memory 510 comprising a data memory and a program memory. The program memory stores programs to control overall operation of the system on a chip. The memory 510 may include an external memory, such, e.g., as a flash memory of the CompactFlash (CF) type, a flash memory of the Secure Digital (SD) type, a flash memory of the Micro-SD type, a flash memory of the Mini-SD type, a flash memory of the Extreme Digital (xD) type, a memory card (of a digital camera) or the like. The memory 510 may also include a disk storage such as, e.g., a hard disk drive (HDD) or a solid state disk (SDD).

The system 500 may additionally include an antenna 530 that can be used both for transmission and for reception and is connected to the RF module 520, with the antenna 530 comprising one or more antenna elements. As an alternative or in addition, one or more antenna 530 may serve as dedicated receiving antenna(s) or dedicated transmitting antenna(s).

The system 500 may also comprise the demodulator 550 capable of demodulating all frequency domain channels independently of each other as described with reference to step 140 above.

The system 500 may be implemented on a number of chips suitably enclosed in a single package (also known as a "system in a package" or SiP, for short).

In one non-limiting embodiment of the present technology, the RF receiving devices and transmitting devices are built around at least one semiconductor chip. Such microcircuits serve various specific RF signal conversion functions such as amplification, attenuation, center frequency alteration, etc.

In another non-limiting embodiments of the present technology, each RF receiving device is built around a single semiconductor microcircuit and each RF transmitting device is around a single semiconductor microcircuit as well. In this case, higher density microcircuits are used so that all requisite transmit or receive functions are performed by only one microcircuit (except for requisite simple external elements and a reference frequency oscillator).

All units used in the system 500 may be implemented using electronic components applicable for building digital integrated circuits. It is believed that such implementational details will be readily apparent for a person skilled in the art and, therefore, will not be described here at any length. The units can be implemented using microcircuits the operation logics of which is determined during manufacture thereof or softwired.

Some parts of the description of the non-limiting embodiments of the present technology, are represented in a form of algorithms and symbolic representation of operations on data bits in the chip memory. Such descriptions and algorithm representations are, essentially, means used by those skilled in the data processing field to most effectively communicate a technical solution subject matter to other persons skilled in this field. An algorithm, as used generally and specifically in this document, is a sequence of computations giving a desired result. Such operations require physical manipulations with physical quantities. Usually, though not necessarily, these quantities assume the forms of electric or magnetic signals which can be stored, transmitted, combined, compared or subjected to other manipulations.

However, it should be kept in mind, that all these terms should be related to the relevant physical quantities and they are merely convenient names applied to these quantities. Unless otherwise specifically and expressly specified in the claims, it should be understood that such terms as "determination," "computation," "calculation," "obtaining," "setting," "alteration," etc. used throughout the text are related to actions and processes of a computer, e.g., a SoC or a similar electronic computing device that operates on data and convert data represented in the form of physical (e.g., electronic) quantities in registers and memories of a computing device and other data similarly represented in the form physical quantities in a memory of registers of a computing device or other similar devices suitable for information storage, transmission or display.

The non-limiting embodiments of the present technology described herein may readily be embodied in other specific forms using the constructions, methods or other material characteristics of the invention in compliance with the herein given detailed description and the claims following below. The described embodiments of invention shall be considered in all respects as having only an illustrative rather than a limiting nature. Thus, the scope of legal protection of the invention is defined in the independent claims enclosed herewith rather than in the preceding description.

The invention claimed is:

1. A method for receiving telemetry messages via an RF channel, the method executable in a System-on-a-Chip (SoC), the SoC including an input RF module, the method comprising:
   receiving, via the RF channel, from an output port of the input RF module, a signal that includes a telemetry message;
   offsetting the signal, the offsetting being executed by:
      at first, offsetting in time the signal such that the offset magnitudes are uniformly spread over a length of data having one bit of information;
      then, offsetting in frequency the signal such that the offset magnitudes are uniformly spread over the space between the Fourier transformation subcarriers,
      the offsetting in frequency being done independently from the offsetting in time;
   subjecting the signal to a sequential Fourier transform, the subjecting being executed such that a first time element of the sequential Fourier transformation is located immediately sequentially to a last time element of a previous Fourier transform, and the length of Fourier transform coincides with a bit length of the telemetry message;
   demodulating the signal based on Fourier coefficients, the demodulation of the signal being executed independently relative to demodulating of other signals by the SoC.

2. The method of claim 1, wherein the method further comprises verifying an integrity of the message.

3. The method of claim 1, wherein the method further comprises executing message validity checks of the signal, the message validity checks being executed independently from message validity checks of other signals.

4. The method of claim 1, wherein the method further comprises filtering out coincident repeated messages that have been independently demodulated.

5. The method of claim 1, wherein the demodulating comprises using inphase and quadrature components of each Fourier coefficient independently between themselves.

6. The method of claim 2, wherein the verifying comprises checking a check sum.

7. The method of claim 6, where the check sum comprises a cyclic redundancy check.

8. A System-on-a-Chip (SoC) for receiving telemetry messages over an RF channel, the SoC comprising:
   at least one RF module configured to receive a signal from a transmitting device antenna;
   at least one memory unit configured to store the signal;
   at least one computer configured to:
      receive, via the RF channel, from an output port of the input RF module, a signal;
      offset the signal, the offsetting being executed by:
         at first, offsetting in time the signal such that the offset magnitudes are uniformly spread over a length of data having one bit of information;
         then, offsetting in frequency the signal such that the offset magnitudes are uniformly spread over the space between the Fourier transformation subcarriers,
         the offsetting in frequency being done independently from the offsetting in time;
      subject the signal to a sequential Fourier transform, the subjecting being executed such that a first time element of the sequential Fourier transformation is located immediately sequentially to a last time element of a previous Fourier transform, and the length of Fourier transform coincides with a bit length of the telemetry message;
      demodulate the signal based on Fourier coefficients, the demodulation of the signal being executed independently relative to demodulating of other signals by the SoC.

9. The SoC of claim 8, wherein the signal originates from the at least one RF module, the at least one RF module being external to the SoC.

10. The SoC of claim 8, the SoC further comprising a low noise signal amplifier.

11. The SoC of claim 8, the SoC further comprising at least one of a receiving antenna and a transmitting antenna.

12. The SoC of claim 8, the SoC further comprising a reference frequency oscillator.

* * * * *